United States Patent
Welter et al.

[11] Patent Number: 6,056,446
[45] Date of Patent: May 2, 2000

[54] CLUTCH RELEASE BEARING

[75] Inventors: Roland Welter, Aurachtal; Roswitha Bäuml, München; Ralf Bössner, Hersbruck, all of Germany

[73] Assignee: INA Wälzlager Schaeffler oHG, Herzogenaurach, Germany

[21] Appl. No.: 09/061,106

[22] Filed: Apr. 16, 1998

[30] Foreign Application Priority Data

Apr. 18, 1997 [DE] Germany .......................... 197 16 218

[51] Int. Cl.[7] .............................. F16C 33/76; F16D 19/00
[52] U.S. Cl. .......................... 384/607; 192/98; 192/91 A
[58] Field of Search ................... 384/607, 612, 384/611, 609, 620; 192/110 B, 98, 91 A

[56] References Cited

U.S. PATENT DOCUMENTS

| | | | |
|---|---|---|---|
| 4,529,075 | 7/1985 | Renaud . | |
| 4,565,272 | 1/1986 | Miyahara | 192/98 |
| 4,579,211 | 4/1986 | Renaud . | |
| 4,637,506 | 1/1987 | Billet . | |
| 4,815,867 | 3/1989 | Ladin | 192/98 X |
| 4,878,572 | 11/1989 | Gay et al. | 192/98 |
| 4,881,629 | 11/1989 | Gay et al. | 192/98 |
| 4,926,993 | 5/1990 | Kusumoto et al. . | |
| 4,951,796 | 8/1990 | Harrington et al. . | |
| 4,969,755 | 11/1990 | Parzefall | 192/110 B X |
| 5,113,988 | 5/1992 | Caron | 192/110 B X |
| 5,400,886 | 3/1995 | Kopacin | 192/98 X |
| 5,547,058 | 8/1996 | Parzefall et al. | 192/98 X |
| 5,810,145 | 9/1998 | Thomire | 192/98 X |

FOREIGN PATENT DOCUMENTS

| | | |
|---|---|---|
| 251805 | 1/1988 | European Pat. Off. ........ 192/98 |
| 0 268 310 A1 | 5/1988 | European Pat. Off. . |
| 0 462 870 A1 | 6/1991 | European Pat. Off. . |
| 2 539 832 | 7/1984 | France . |
| 2 693 523 | 1/1994 | France . |
| 35 05 878 C2 | 8/1985 | Germany . |
| 88 05 873 | 5/1988 | Germany . |
| 88 09 903 | 10/1988 | Germany . |
| 2 290 837 | 5/1994 | United Kingdom . |

*Primary Examiner*—Thomas R. Hannon
*Assistant Examiner*—Brandon C. Stallman
*Attorney, Agent, or Firm*—Akin, Gump, Strauss, Hauer & Feld, L.L.P.

[57] ABSTRACT

The invention concerns a rolling bearing for a release device of a friction clutch. The rolling bearing (1a) includes a rotating outer bearing ring (12) and a rotationally fixed inner bearing ring (2). Rolling elements (15) are guided in an inner space (14) between the bearing rings which is sealed by a sealing element. The inner space (14) of the rolling bearing (1a) is sealed on one side of the rolling elements (15) by a sealing element (20) and on the other side of the rolling elements (15) by a retention element (7). The sealing element and the retention element are each rotationally fixed on one of the bearing rings, and free ends of the sealing element and the retention element extend up to the respective other bearing ring of the rolling bearing (1a) to create a large axial or radial overlap which forms an annular gap (25, 26).

24 Claims, 5 Drawing Sheets

Fig. 11

CLUTCH RELEASE BEARING

BACKGROUND OF THE INVENTION

The invention concerns a rolling bearing for a release device of a friction clutch arranged preferably between an internal combustion engine and a mechanical automobile transmission, with the rolling bearing comprising a rotating outer bearing ring and a rotationally fixed inner bearing ring which coaxially surrounds an actuating element, a radial spacing of the inner and the outer bearing ring forming an annular inner space which is laterally closed by sealing means and holds rolling elements provided with a friction-reducing lubricant. The bearing rings of the rolling bearing comprise parallel support flanges extending perpendicular to a longitudinal axis of the rolling bearing, through which support flanges the inner bearing ring is force-locked against the actuating element with the help of a disc spring arranged between the support flange and a retention element and the outer bearing ring is force-locked on disengaging levers of the friction clutch.

In a similar rolling bearing of the above-noted type known from the document DE-C 34 14 106, a sealing of the inner space of the rolling bearing is achieved by a deflector ring which is rotationally fixed on one of the bearing rings and whose free end extends to near an inner surface of the opposite bearing ring. On the side of the rolling elements remote from the deflector ring, the inner space is sealed by the support flange of one of the bearing rings which extends to near the opposite bearing ring. An alternate prior art solution provides an elastic seal which is rotationally fixed on one of the bearing rings and is in sliding contact with the other bearing ring. These prior art means for a lateral sealing of the inner space of rolling bearings for release devices of friction clutches are inadequate. The leak gap of the prior art between the deflector plate and the bearing ring has a small dimension, however that it cannot prevent penetration of abraded material from the driver plate of a friction clutch. The use of an elastic seal which bears sealingly against one of the bearing rings has an adverse effect on the frictional torque of the rolling bearing and leads to a warming of the rolling bearing which detracts from the working life of the rolling bearing.

SUMMARY OF THE INVENTION

It is an object of the invention to eliminate the technical drawbacks of known devices by creating a seal for a rolling bearing for use in release devices which can be installed in the available design space and which, without increasing the number of structural elements, assures an improved sealing action without influencing the frictional torque and the thermal loading of the rolling bearing.

This and other objects and advantages of the invention will become obvious from the following detailed description.

The invention achieves the above objects by the fact that the inner space of the rolling bearing is sealed by sealing elements rotationally fixed on each side of the rolling elements on a bearing ring, with the free ends of the sealing elements being configured to correspond to a contour of the respective other bearing ring to create a large axial and/or radial overlap while forming a sealing gap. This configuration of the sealing elements permits the formation of a clearly larger and longer sealing gap than in known sealing arrangements for rolling bearings used in release devices which improves the efficiency of sealing. Further, the measures provided by the invention according to which the sealing means are spaced from and cooperate with the adjacent bearing ring without contact, do not adversely affect the frictional torque. In addition, the contactless sealing means have no negative influence on the warming of the rolling bearing which is advantageous for the lubrication and thus also for the working life of the rolling bearing.

In a preferred embodiment of the sealing element of the invention, this sealing element is rotationally fixed on the inner ring on the side of the rolling elements remote from the support flange. The sealing element comprises an end section which coaxially surrounds the outer bearing ring with the formation of an annular gap. This measure enables the formation of an annular gap with a large axial extent which effectively prevents a penetration of dirt particles into the inner space of the rolling bearing.

In another embodiment of the invention, the sealing element is shape-locked on the outer surface of the outer ring, from which it further extends in an axial direction at the end remote from the support flange while forming a radially inwards oriented circumferential collar on the end. The sealing element is associated with an inner ring whose end portion is oriented radially outwards and overlapped radially outwardly by the collar of the sealing element.

In a further advantageous embodiment of the invention, the retention element on which the disc spring is supported for establishing a force locking of the inner ring on the actuating element of the release device is lengthened in radial direction parallel to the support flange of the outer ring. The outer periphery of the retention element forms an offset in the shape of a U turned through 90° which is open towards the rolling elements and forms a gap with the support flange. Advantageously, the retention element can be made to extend to near an inner surface of an axially extending section of the outer ring so that the length of the sealing gap is increased. The offset portion of the retention element improves the inherent rigidity of the retention element while at the same time forming a collecting space or reservoir for the lubricant of the rolling elements. The retention element, on which the disc spring for creating a force-locking of the inner ring on the actuating element is supported, can be configured in a simple manner to simultaneously assume the function of a sealing element. This results in a desired reduction of components and thus also in cost reduction.

In a preferred embodiment of the invention, a further sealing element having an L- or U-shaped profile is positionally fixed on the inner surface of the outer ring, and an inner, preferably axially extending arm of this sealing element extends to near an inner contour of the inner ring, such that an annular gap is formed between the free end of the arm and the inner ring.

A favorable manner of configuring a sealing element which is to be arranged with clearance outwardly around the outer ring, is to have an L-shaped section of the sealing element positionally fixed on the inner ring. A shape-locking can then be effected, for example, by a short axially extending arm of the sealing element which merges into an outwardly directed radial section. This radial section continues through a right-angled bend into an axially extending arm which is adapted to the outer contour of the outer bearing ring and encloses the convex outer region of the outer ring which corresponds to the rolling element raceway thus resulting in the formation of a long overlap region. To intensify its shape-locking, the sealing element is fixed on the bearing ring preferably through an axial section having a wavy profile. A positional fixing is achieved by an arrangement of the profile on some portions only of the axial section or by additional shape-locking. A cost-effective means for achieving a shape-locked fixation is to configure the sealing element with a defined axial overlength relative to the inner ring and swage this overlength radially inwards. The sealing element which is pressed against the inner ring, and especially against the bend thereof, thus forms, together with the swaging, a durable interference fit of the sealing element. A mounting and/or transportation security is provided by the invention in the form of a radially inwards bent edge on the free end of the outer arm of the sealing element which overlaps the outer contour of the outer ring in a radial direction. This combined mounting and transportation security further enhances the sealing action of the sealing element because the bent edge effectively prevents the penetration of dirt particles into the annular gap.

The invention further provides a configuration of a sealing element which is fixed directly by its bush-like, axially extending section on the inner ring. To obtain a larger overlap, the free end of the inner ring ends in an axially outwardly directed angled portion which is entirely surrounded by the sealing element which ends flush with an end face of the angled portion. Such an economically manufacturable and easy-to-mount sealing element provides a further cost advantage.

A further useful measure offered by the invention for improving the efficiency of the sealing element is a bead provided on the inner surface of the outer bushlike section of the sealing element surrounding the outer ring. In the installed state of the sealing element, the bead is associated with the end face of the outer ring and effects a defined partial radial overlap of the outer contour of the outer ring thus resulting in the formation of a longer sealing gap. This configuration also effectively prevents a loss of lubricant because the bead forms a step resembling a labyrinth in front of the annular gap.

In a further embodiment of the sealing element which is rotationally fixed on the outer ring, an exact positional fixing is achieved by the fact that the radially inwards directed collar bears against the end face of the outer ring. To simplify the fabrication of the sealing element which comprises a radially inwards directed collar bent at right angles, the longitudinal extent of the outer ring is larger than that of the inner ring. To enhance the sealing efficacy of the sealing element, a seal is inserted in the region of contact of the collar on the end face of the outer ring. This seal prevents a loss of lubricant from within the outer ring through a leak gap which forms between the sealing element and the peripheral surface of the outer ring due to the centrifugal force arising from a rotation of the outer ring. As an advantageous measure for preventing abraded material from the driver plate and dirt particles in general from entering the inner space of the rolling bearing, the sealing element of the invention can comprise a radially stepped extension arranged axially in front of the end face of the outer ring. The extension bridges an axial length difference between the outer ring and the flange of the inner ring. To improve the efficacy of this sealing element, a sealing ring can be inserted between the extension and the end face of the outer ring.

In a further embodiment of the invention, the sealing ring which is positionally fixed on the outer ring comprises a radially inwards directed step which, in the installed state, bears against the end face of the outer ring and compensates for an axial and a radial offset to the flange of the inner ring. The collar of the sealing element radially overlaps the flange of the inner ring with the formation of an annular gap.

A measure for improving the efficiency of a sealing element comprising a radial step is to apply a separate seal or sealing disc to its inner surface. For example, a seal made of an elastic sealing material and comprising an inwards projecting bead on an outer radius of curvature between the section and the collar can be arranged on the inner surface of the sealing element in the region of the step. Advantageously, the bead is configured to form, on the one hand, an annular gap into which the free end of the outer ring engages, this being advantageous for the sealing of a leak gap which forms between the peripheral surface of the outer ring and the inner surface of the section of the sealing element. On the other hand, the bead forms a U-shaped recess into which the flange of the inner ring engages with clearance to prolong the labyrinth-type annular gap.

The sealing element with the stepped configuration can further be provided with a sealing disc which, in the installed state, is inserted between the end face of the outer ring and a radial section of the sealing element. The sealing disc and the collar of the sealing element define a substantially inverted U-shaped annular space into which the flange of the inner ring projects to form a labyrinth-type annular gap.

To create an effective shape-locked fixation of the retention element on the actuating element, the retention element comprises at least two fixing clips which extend coaxially with the longitudinal axis of the rolling bearing and comprise integrally formed retention lugs which, in the installed state, are engaged into corresponding recesses of the actuating element which is configured as an annular piston, the retention lugs snapping positively onto a shoulder.

The invention further provides a retention element comprising an axially oriented bent edge which engages around a radially oriented support flange of the inner ring. A disc spring which is supported inwardly against a flange of a retention clip serves to force-lock the retention element on the support flange. The retention clip has a substantially Z-shaped profile, and an axial section of the retention clip remote from the flange engages around an end region of the actuating element on which it is shape-locked by snap lugs.

In an alternative arrangement, the support flange of the inner ring bears directly against a shoulder of the actuating element. Force-locking is achieved by a disc spring which is inserted between the support flange and a locking ring arranged in an annular groove of the actuating element.

The invention also provides a configuration of a retention element in which, in the installed state, the offset region nearest the support flange is at least substantially on a level with the center of the rolling elements of the rolling bearing i.e., with the pitch circle diameter of the rolling elements. This positional correspondence permits, if necessary, an optimum supply of lubricant to the rolling elements and their tracks if the offset region is used as a lubricant reservoir.

A suitable material for an economic production of the sealing and retention elements is steel sheet from which these elements can be made at low cost by deep drawing without machining. Alternatively, these elements can also be made of a plastic which, for improving strength properties, should preferably be a glass fiber reinforced plastic such as PA 66 GF.

BRIEF DESCRIPTION OF THE DRAWINGS

The foregoing summary, as well as the following detailed description of preferred embodiments of the invention, will be better understood when read in conjunction with the appended drawings. The drawings are for the purpose of illustrating the present invention which is not limited to the devices and instrumentalities shown.

In the drawings.

DETAILED DESCRIPTION OF THE INVENTION

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the clutch release bearing and designated parts thereof. The terminology includes the words specifically mentioned above, derivatives thereof and words of similar import.

Figure 1:
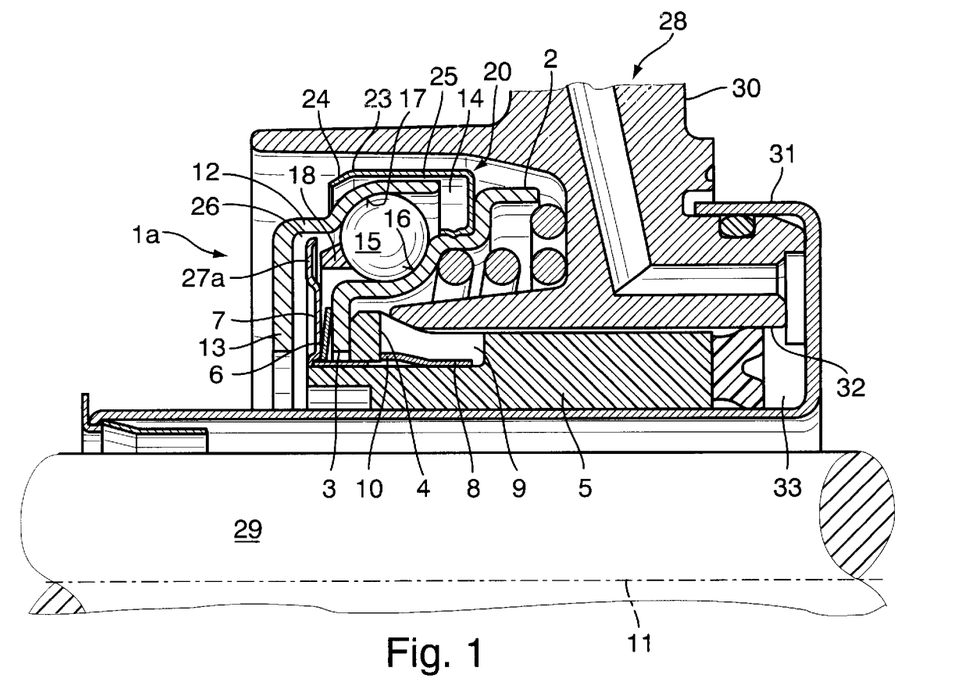
FIG. 1 is a semi-cross-section of a rolling bearing of the invention in the installed state, with the sealing element positionally fixed on the inner bearing ring.

FIG. 1 shows a rolling bearing 1a of a known type for release devices comprising a sealing element of the invention. A formed inner ring 2 of the rolling bearing 1a bears by a support flange 3 against a shoulder 4 of an actuating element 5 which is made in the form of an annular piston. A disc spring 6 is located between a retention element 7 and the side of the support flange 3 remote from the shoulder 4. The retention element 7 has an annular configuration and comprises a plurality of retention clips 8 bent at right angles and extending coaxially with the actuating element 5 to be inserted into recesses 9 and which, in the installed state, are snapped onto the shoulder 4 by radially biased retention lugs 10. An outer ring 12 of the rolling bearing 1a likewise comprises a support flange 13 extending perpendicular to a longitudinal axis while being axially spaced from the support flange 3. Rolling elements 15 arranged in an inner space 14 formed by a radial spacing of the inner ring 2 to the outer ring 12 are retained in a cage 18 and guided on tracks 16, 17 of the inner and the outer rings 2, 12. The assembly of the individual components of the rolling bearing requires that the inner and outer rings 2, 12 be configured so that the inner space 14 is open laterally of the rolling elements 15 through an opening of substantially annular shape. This opening has to be provided with a seal to prevent an entry of dirt particles and a loss of lubricant from the inner space 14.

The sealing of the inner space 14 is achieved by a sealing element 20 with a substantially U-shaped profile turned through 90° and arranged on the side of the rolling elements 15 remote from the support flange 13. The sealing element 20 is located on the inner ring 2 by a short axially extending arm 19. A positional fixing and/or prevention of rotation is achieved in that the arm 19 comprises a retention lug 21 which interlocks with a mating recess of the inner ring 2. The arm 19 merges into a radially extending section 22 which is supported on a corresponding portion of the inner ring 2. The section 22 continues into an axially extending arm 23 which is parallel to and considerably longer than the arm 19. The arm 23 has a bushlike configuration and radially surrounds an outer contour of the outer ring 12 with clearance. The arm 23 extends in longitudinal direction beyond a convex outer contour of the outer ring 12 in the region of the tracks 16 and 17 for the rolling elements 15. To enhance its sealing action, the sealing element 20 is arranged with clearance to the outer ring 12 to form a defined annular gap 25. At its free end, the arm 23 comprises an inwardly inclined bent edge 24 which radially overlaps the outer contour of the outer ring 12 and thus secures all the components of the rolling bearing 1a for mounting and against loss.

A further sealing element for the rolling bearing 1a is provided by a specially configured retention element 7 which extends up to an inner contour of the outer ring 12 with formation of an annular gap 26. At its outer peripheral end, the retention element 7 comprises an offset portion 27a which is open towards the rolling elements 15 and can, for example, be used as a reservoir for lubricant. In addition, the offset portion 27a which is parallel to the support flange 13 forms an extension of the annular gap 26 so that sealing is further improved. The retention element 7 thus fulfils a double function which results in a reduction of the number of required components and eliminates the need of an additional, separate sealing element. FIG. 1 demonstrates that both the sealing element 20 and the retention element 7, which simultaneously functions as a sealing element, can be integrated in the existing design space of the rolling element 1. The means of the invention therefore require no structural modifications to the release device 28 which, as shown in FIG. 1, surrounds the rolling bearing 1a in an end position.

The release device 28 is comprised of a pressure housing 30 arranged coaxially with a primary shaft 29, a guide bush 31 which serves to guide the actuating element 5 being fixed on the pressure housing 30 to extend radially spaced both from the primary shaft 29 and from a longitudinal bore 32 of the pressure housing 30. The actuating element 5 in the form of an annular piston, the guide bush 31 and the pressure housing 30 together define a pressure chamber 33 which can be pressurized by a pressure fluid for axially displacing the actuating element 5.

In four further examples of embodiments (FIGS. 2 to 6) of rolling bearings 1b to 1e of the invention, parts identical to those described in connection with the first embodiment are designated by the same reference numbers so that reference may be made to the first embodiment for their description.

Figure 2:
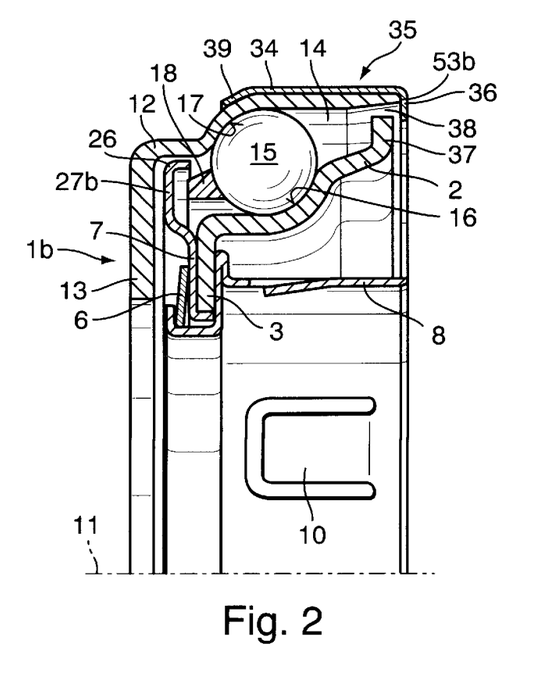
FIG. 2 is a drawing of a rolling bearing of the invention having a sealing element which is shape-locked on the outer bearing ring.

The rolling element 1b shown in FIG. 2 comprises a sealing element 35 which is positionally fixed on a bushlike section 34 of the outer, axially extending section of the outer ring 12. At its end remote from the rolling elements 15, the sealing element 35 forms, on an end face 53b of the outer ring 12, a radially inwards directed, preferably continuous circumferential collar 36 whose longitudinal extent radially overlaps a free end of the inner ring 2 which is configured as a flange 37. To create a contactless sealing between the rotating outer ring 12 and the rotationally fixed inner ring 2, an annular gap 38 is formed by an axial spacing between the flange 37 and the collar 36. To assure an exact positioning of the deep drawn steel sheet sealing element 35, the section 34 thereof comprises at its end remote from the collar 36, a crimping 39 which is mated to a convex section of the outer ring 12. The retention element 7 comprising the offset portion 27b is comparable to the retention element 7 of FIG. 1. A loss of lubricant between the section 34 of the sealing element 35 and the outer ring 12 is reliably prevented by a sealing ring 41 inserted between the end face of the outer ring 12 and the collar 36.

Figure 3:
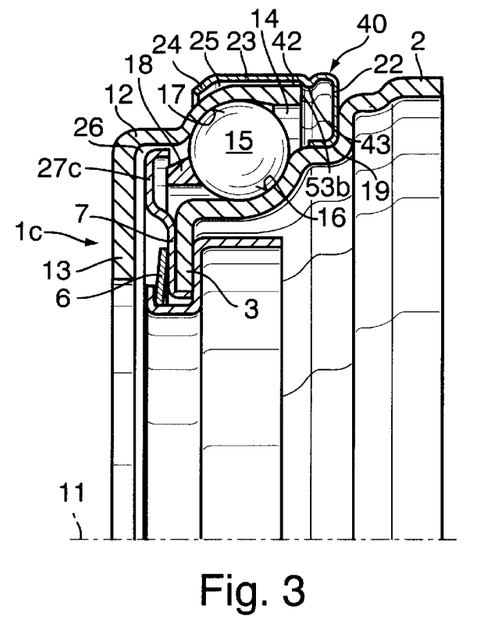
FIG. 3 shows a further embodiment of a rolling bearing comprising a radially prolonged retention element which also serves as a sealing element.

The rolling bearing 1c of FIG. 3 comprises a sealing element 40 which is arranged and configured substantially similar to the sealing element 20 of FIG. 1 with the difference that the arm 23 of the sealing element 40 comprises a radially inwards oriented circumferential bead 43 which, in the installed state, extends up to the end face 53b of the outer ring 12 with formation of an annular gap. The bead 43 creates a prolonged annular or sealing gap 42 and thus improves the efficiency of sealing of the sealing element 40. FIG. 3 further shows a retention element 7 with an alternative configuration whose offset portion 27c has a prolonged radial section which results in the formation of a larger lubricant reservoir and a longer annular gap 26.

Figure 4:
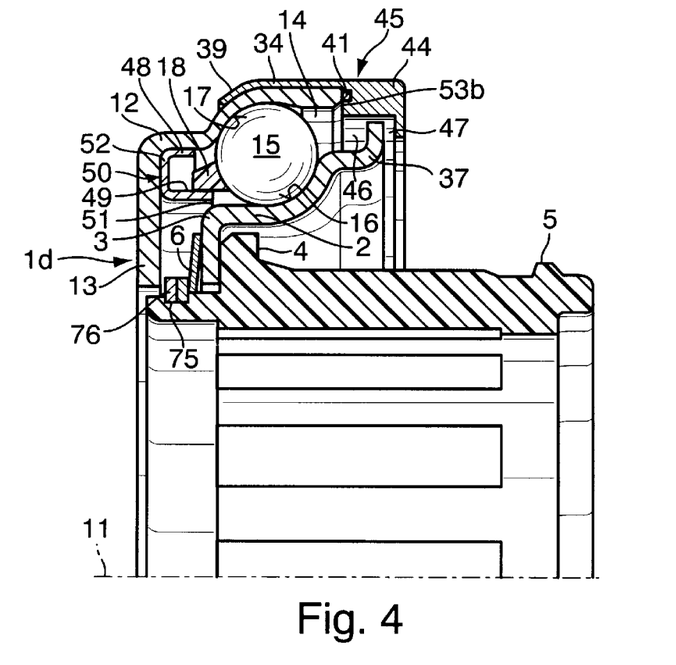
FIG. 4 shows a rolling bearing of the invention combined with an actuating element of a release device and comprising a U-shaped sealing element positionally fixed on a support flange of the outer ring.

The rolling bearing 1d of FIG. 4 comprises a sealing element 45 which, similar to the sealing element 35 of FIG. 2, is rotationally fixed by shape-locking on the outer ring 12. The section 34 of the sealing element 45 forms an extension 44 which is arranged in front of the end face 53b of the outer ring 12 and bridges both an axial length difference and a radial height difference between the outer ring 12 and the flange 37 of the inner ring 2. As an alternative to an integral formation of the extension 44, the sealing element 45 may be put together from a separately made section 34 and an extension 44. Advantageously then, the extension 44 is made of a plastic and is undetachably fixed, e.g. by vulcanization, on the section 34 which is made as a deep drawn part out of steel sheet. A loss of lubricant which can occur in a heated state of the rolling bearing 1d through a leak gap which forms between the section 34 and the peripheral surface of the outer ring 12 is prevented by a sealing ring 41 arranged in the extension 44 in the region of the end face of the outer ring 12. In the region of the support flanges 3, 13, the rolling bearing 1d comprises a sealing element 50 which is made preferably of steel sheet by deep drawing and has a U-shaped cross-sectional profile turned through 90°. The sealing element 50 bears by a radially extending section 52 against the inner surface of the support flange 13. The outer arm 48 of the sealing element 50 which is bent at right angles to the section 52 is supported on the inner surface of the outer ring 12 while the inner arm 49 extends up to the inner ring 2 with formation of an annular gap 51. To secure the inner ring 2 on the actuating element 5, the support flange 3 is supported on the shoulder 4 of the actuating element 5. Force-locking is effected by the disc spring 6 which is arranged between the support flange 3 and a locking ring 76 disposed in an annular groove 75 of the actuating element 5.

Figure 5:
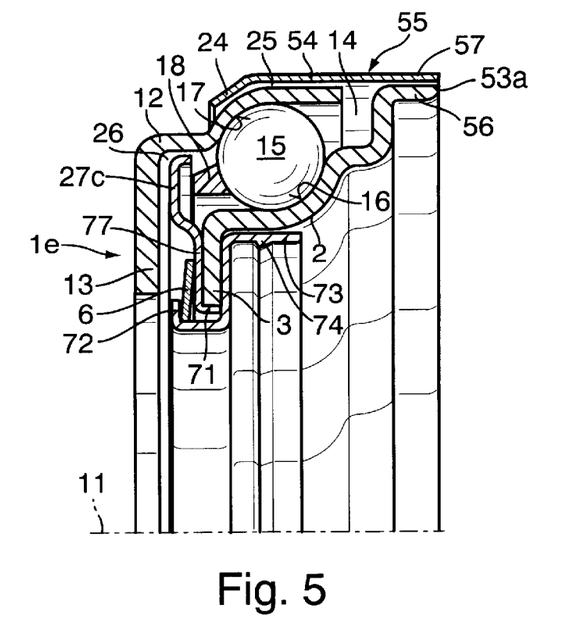
FIG. 5 shows a rolling bearing having a sealing element which is positionally fixed on an axially extending angled portion of the inner ring.

A further embodiment of a sealing element 55 of the invention associated to the rolling bearing 1e is shown in FIG. 5. The sealing element 55 comprises a section 54 arranged coaxial to the longitudinal axis 11 of the rolling bearing 1e and having an inwardly inclined, bent edge 24 in the region of the rolling elements 15 which assures a radial overlap of the outer contour of the outer ring 12. At its end remote from the bent edge 24, the section 54 is rotationally fixed in the region of a retention tongue 57 on the angled edge 56 of the inner ring 2. The end of the section 54 terminates flush with the end face 53a of the inner ring 2. A permanent fixing of the section 54 on the angled edge 56 can be achieved, for example, by an interference fit or by gluing. Alternatively, these parts may also be undetachably connected by soldering or welding. It is also possible to fix the section of the sealing element on the angled edge of the inner ring by force- and shape-locking. The sealing element 55, which is preferably made of tempered sheet metal, is economic to manufacture and mount and, at the same time, enlarges the inner space 14 resulting advantageously in the formation of a larger lubricant reservoir laterally of the rolling elements 15. A force-locking of the retention element 77 on the support flange 3 of the inner ring 2 is achieved by the disc spring 6 which is supported between the outer surface of the retention element 77 and an inner surface of a flange 72 of the retention clip 73. This retention clip 73 which has a substantially Z-shaped profile, surrounds an end region of the actuating element 5 by a radially outer section while being positively locked thereon by snap lugs 74. To enable a correctly oriented arrangement of the retention element 77 on the inner ring 2, the retention element 77 comprises an inwardly oriented right-angled bent edge 71 which engages around the free end of the support flange 3 of the inner ring 2.

Figure 6:
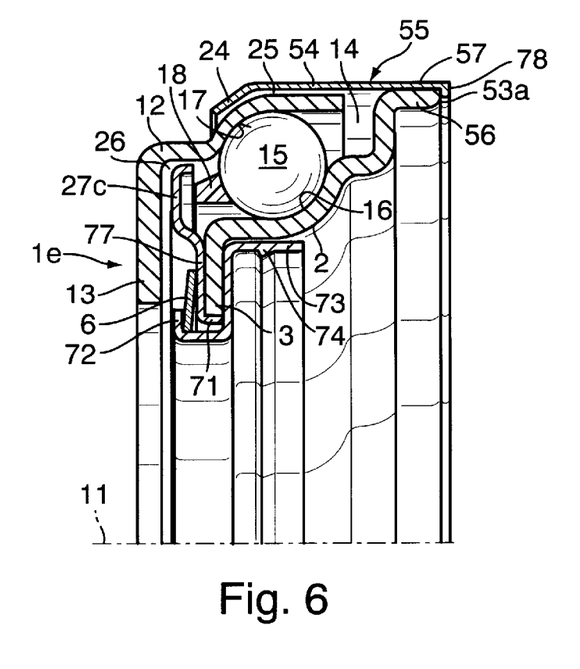
FIG. 6 is a view of a rolling bearing similar to FIG. 5 in which the sealing element is fixed on the inner ring in a different manner.

FIG. 6 shows the rolling bearing 1e of FIG. 5 with the sealing element 55 fixed in a different manner. The section 54 of the sealing element 55 comprises an axial overlength compared to the angled edge 56 of the inner ring 2. This axial overlength is bent radially inwards to form a swaging 78 resulting in a radial overlap between the outer contour of the angled edge 56 and an inner region of the swaging 78 in the region of the end face 53a.

Figure 7:
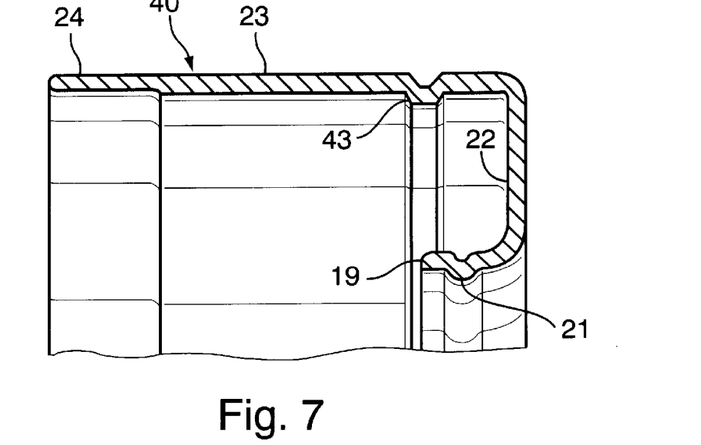
FIG. 7 is a component drawing of the sealing element of FIG. 3.

The sealing element 40 of FIG. 3 is shown more clearly in the component drawing of FIG. 7 which clearly illustrates the U-shaped profile of the sealing element 40 which is supported on the inner ring 2, see FIG. 3, by the relatively short arm 19 and the section 22 extending radially outwards therefrom. A rotational fixing of the sealing element 40 is assured by circumferentially spaced retention lugs 21 which snap positively into corresponding recesses of the axially extending section of the inner ring 2. The outer, prolonged or extended section 23 comprises a radially inwards oriented bead 43 which, in the installed state, is arranged near the end face 53b of the outer ring 12 and thus permits an extension of the annular gap 25. See FIG. 3. The inner surface of the free end of the arm 23 has a stepped configuration. This wall thickness reduction simplifies a chipless forming of the bent edge 24. See FIG. 1.

Figure 8:
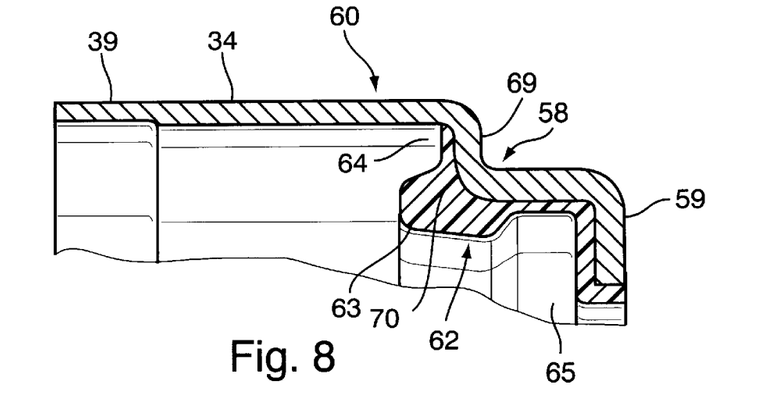
FIG. 8 is a component drawing of a sealing element fixed on the outer ring and having a radially inwards directed step with a seal applied to an inner surface to surround the stepped region.

Another configuration of a sealing element is shown in FIG. 8. This sealing element 60 is positionally fixed on the outer peripheral surface of the outer ring 12 and comprises a step 58 which, in the installed state, is oriented radially inwards and forms a radially oriented collar 59 at the free end. A seal 62 is applied to the inner surface of the sealing element 60 in the region of the step 58 and extends from the section 69 to the collar 59. In the region of an outer radius 70, the seal 62 forms a bead 63 which, together with the section 34, defines an annular space 64 and forms a substantially inverted U-shaped annular recess 65 which is spaced from the collar 59. The dimensions of the annular space 64 correspond substantially to the dimensions of the free end of the outer ring 12. The recess 65 exceeds the wall thickness of the flange of the inner ring so that a labyrinth-type annular gap is formed between the outer contour of the flange and the seal. Advantageously, the seal 62 is made of an elastic sealing material so that, on mounting of the sealing element 60, a radial overlap is formed between the flange 37 of the inner ring 2 and an inner contour of the bead 63, and the flange 37 can be introduced into the recess 65 by an elastic deformation of the sealing material.

Figure 9:
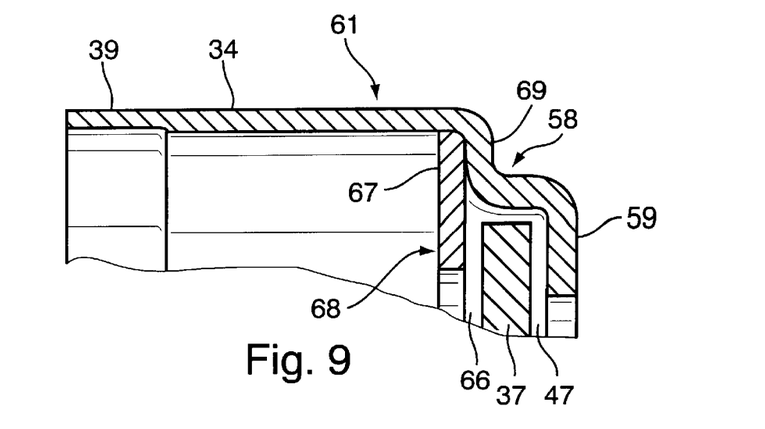
FIG. 9 shows a sealing element similar to FIG. 8 which includes a sealing disc.

FIG. 9 is a component drawing of a sealing element 61 whose configuration corresponds substantially to that of the sealing element 60 of FIG. 8. However, the sealing element 61 is provided with a sealing disc 68 which can be inserted as a loose part and, in the installed state, is supported on the section 69 in the region of the step 58. The sealing element 61 simplifies assembly for which the sealing disc 68 is at first brought to bear with its support surface 67 against the end face 53b of the outer ring 12 before the inner and the outer bearing ring 2, 12 are assembled. Following this, the sealing element 61 is pushed, with the section 34 ahead, axially onto the outer peripheral surface of the outer ring 12 and positionally fixed thereon. This arrangement creates an advantageously longer labyrinth-type annular gap 47 which is formed between the flange 37 of the inner ring 2 and the collar 59 and the sealing disc 68 of the sealing element 61.

Figure 10:
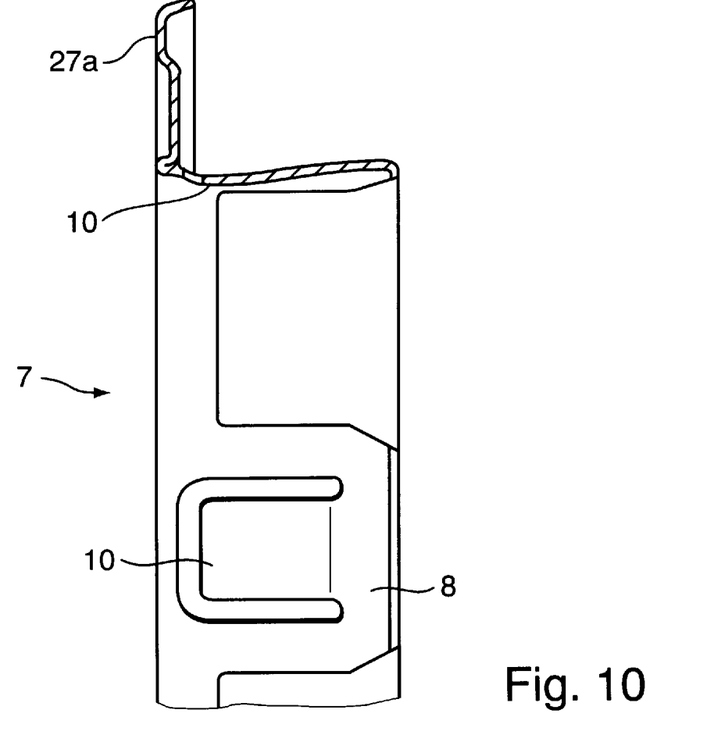
FIG. 10 is a component drawing of the retention element shown in FIG. 3 in the installed state.

FIG. 10 is a sectional representation of the retention element 7 which, as already mentioned, additionally assumes the function of a sealing element, see FIG. 1. The retention element 7 formed without machining from steel sheet comprises circumferentially spaced retention clips 8 which are formed integrally with retention lugs 10. In an installed state, these radially inwards oriented retention lugs 10 lock positively on the actuating element 5. See FIG. 1. A disc-like section having a continuous offset portion 27a on its outer periphery extends at right angles to the retention clips 8. The offset portion 27a forms a substantially U-shaped circumferential groove turned through 90° which is open towards the retention clips 8.

Figure 11:
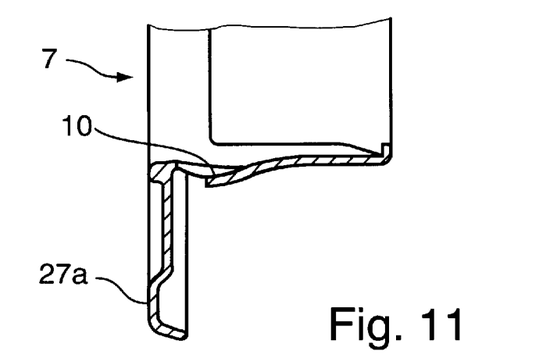
FIG. 11 shows a retention element similar to that of FIG. 10 but having a radially outwards pointing retention lug.

The retention element 7 shown in FIG. 11 comprises, in contrast to FIG. 10, radially outwards oriented retention lugs 10. In the installed state of the retention element 7, see FIG. 1, these retention lugs 10 snap onto the shoulder 4 of the actuating element 5.

What we claim is:

1. A rolling bearing for a release device of a friction clutch arranged between an internal combustion engine and a mechanical automobile transmission, the rolling bearing comprising a rotating outer bearing ring (12) and a rotationally fixed inner bearing ring (2) which are located coaxially around an actuating element (5), a radial spacing of the inner and the outer bearing rings forming an annular inner space (14) which is laterally closed by sealing means and contains rolling elements (15) provided with a friction-reducing lubricant, the inner bearing ring (2) and the outer bearing ring (12) comprising parallel support flanges (3, 13) extending perpendicular to a longitudinal axis (11) of the rolling bearing (1a to 1e), the inner bearing ring (2) being adapted to be force-locked against the actuating element (5) by a disc spring (6) arranged between the support flange (3) and a retention element (7, 77) and the outer bearing ring (12) being adapted to be force-locked on disengaging levers of the friction clutch, the inner space (14) of the rolling bearing (1a to 1e) being sealed on one side of the rolling elements (15) by a sealing element (20, 35, 40, 45, 50, 55, 60, 61) and on the other side of the rolling elements (15) by said retention element (7, 77), said sealing element being rotationally fixed on one of the bearing rings and said retention element being rotationally fixed on one of the bearing rings, the sealing element and the retention element each having free ends which are configured to correspond to a contour of a respective other bearing ring of the rolling bearing (1a to 1e) to create an enlarged axial or radial overlap which forms an annular gap (25, 26, 38, 42, 47, 51) of the rolling elements.

2. The rolling bearing of claim 1 wherein the sealing element (20, 40, 50, 55) is rotationally fixed on the inner ring (2) on the side of the rolling elements (15) remote from the support flange (3), said sealing element coaxially surrounding an end portion of the outer ring (12) to form the annular gap (25).

3. The rolling bearing of claim 1 wherein the sealing element (35, 45, 60, 61) is rotationally fixed directly on the outer ring (12) and comprises a collar (36, 59) or an extension (44) which, in an installed state, is located near an end face (53b) of the outer ring (12) remote from the support flange (13), said collar or extension overlapping a free, radially inwardly directed flange (37) of the inner ring (2) with a clearance to form the annular gap (38, 47).

4. The rolling bearing of claim 1 wherein the retention element (7) extends parallel to the support flange (13) of the outer ring (12) and comprises, on a free end, an offset portion (27a) turned away from the rolling elements (15), said offset portion extending up to an inner surface of the outer ring (12) to form the annular gap (26).

5. The rolling bearing of claim 1 wherein the sealing element (50) is positionally fixed on an inner surface of support flange (13) of the outer ring (12) and comprises an arm (49) which extends up to the inner ring (2) to form the annular gap (51).

6. The rolling bearing of claim 2 wherein the sealing element (20) is rotationally fixed by a profiled section on an axially extending region of the inner ring (2).

7. The rolling bearing of claim 2 wherein the sealing element (55) is fixed by a section (54) on an axially extending angled edge (56) of the inner ring (2) and ends flush with an end face (53a) of the inner ring (2).

8. The rolling bearing of claim 2 wherein the sealing element (55) is pressed onto an angled edge (56) of the inner ring (2) and is shape-locked on an end face (53a) of the inner ring (2) by a swaging (78).

9. The rolling bearing of claim 2 wherein the sealing element (20) comprises an outer, bush-shaped axially extending arm (23) which surrounds the outer ring (12) including a convex portion of the outer ring (12) in a region of a track (17) of the rolling elements (15).

10. The rolling bearing of claim 9 wherein a security device for mounting and against loss is formed by an inwardly inclined, circumferential bent edge (24) on a free end of the arm (23) of the sealing element (20).

11. The rolling bearing of claim 9 wherein the arm (23) comprises an inwardly oriented circumferential bead (43) which, in an installed state, is situated adjacent an end face (53b) of the outer ring (12).

12. The rolling bearing of claim 3 wherein, in an installed state, the collar (36) of the sealing element (35) bears against an end face of the outer ring (12) and radially overlaps the flange (37) of the inner ring (2) which is axially offset to the end face of the outer ring (12).

13. The rolling bearing of claim 3 wherein the sealing element (45) comprises an extension (44) which is arranged axially in front of the end face (53b) of the outer ring (12) and bridges an axial length difference and a radial height difference between the outer ring (12) and the flange (37) of the inner ring (2).

14. The rolling bearing of claim 12 wherein a sealing ring (41) is inserted between the extension (44) and the end face of the outer ring (12).

15. The rolling bearing of claim 3 wherein the sealing element (60, 61) comprises a radially inwardly directed step (58) having an inner surface upon which one of a separate seal (62) and a sealing disc (68) is fixed.

16. The rolling bearing of claim 15 wherein the seal (62) is fixed to the inner surface, is made of an elastic sealing material and extends over the entire region of the step (58) and a radially inwardly directed collar (59), said seal comprising a bead (63) to form an annular space (64) adjacent a section (34) of the sealing element and an annular recess (65) adjoining the collar (59).

17. The rolling bearing of claim 15 wherein the sealing disc is fixed to the inner surface and, in an installed state, the sealing disc (68) is supported on a radially extending section (69) of the sealing element (61).

18. The rolling bearing of claim 4 wherein the retention element (7) comprises at least two retention clips (8) extending coaxially to the longitudinal axis (11) of the rolling bearing (1*a*) and includes integrally formed retention lugs (10) which, in an installed state, snap positively onto the actuating element (5).

19. The rolling bearing of claim 1 wherein the retention element (77) engages positively around the support flange (3) by an axially oriented bent edge (71), and the disc spring (6) is supported on an inner surface of a flange (72) of a retention clip (73) and on an outer surface of the retention element (77).

20. The rolling bearing of claim 19 wherein the retention element (77) is positively retained on the actuating element (5) by snap lugs (74).

21. The rolling bearing of claim 1 wherein, for a fixing of the inner ring (2), the support flange (3) of the inner ring (2) is adapted to be force-locked on a shoulder (4) of the actuating element (5) by the disc spring (6) which, on an opposite side, bears against a locking ring (76) arranged in an annular groove (75) of the actuating element (5).

22. The rolling bearing of claim 4 wherein, in the installed state, the offset portion (27*a*, 27*b*, 27*c*) of the retention element (7) is on a level with a pitch circle diameter of the rolling elements (15).

23. The rolling bearing of claim 1 wherein the sealing element (20, 35, 40, 45, 50, 55, 60, 61) and the retention element (7) are made as deep drawn parts out of sheet metal without machining.

24. The rolling bearing of claim 1 wherein the sealing element (20, 35, 40, 45, 50, 55, 60, 61) and the retention element (7) are made of a plastic.

\* \* \* \* \*